(12) United States Patent
Deiss et al.

(10) Patent No.: US 10,296,235 B2
(45) Date of Patent: May 21, 2019

(54) PARTIAL VOLUME REORGANIZATION TO INCREASE DATA AVAILABILITY

(71) Applicant: International Business Machines Corporation, Armonk, NY (US)

(72) Inventors: Andrew E. Deiss, McNeal, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/193,932

(22) Filed: Jun. 27, 2016

(65) Prior Publication Data

US 2017/0371579 A1 Dec. 28, 2017

(51) Int. Cl.
*G06F 3/06* (2006.01)
(52) U.S. Cl.
CPC ............ *G06F 3/0617* (2013.01); *G06F 3/067* (2013.01); *G06F 3/0644* (2013.01); *G06F 3/0665* (2013.01)
(58) Field of Classification Search
CPC .. G06F 2206/1004; G06F 3/06–3/0689; G06F 3/08; G06F 2003/0691–2003/0698; G06F 12/00–12/16; G06F 13/00–13/4295
See application file for complete search history.

(56) References Cited

U.S. PATENT DOCUMENTS

| | | | |
|---|---|---|---|
| 4,630,030 A | 12/1986 | Roy | |
| 5,551,027 A | 8/1996 | Choy et al. | |
| 5,956,712 A | 9/1999 | Bennett et al. | |
| 6,675,175 B2 | 1/2004 | Branch et al. | |
| 6,754,656 B1 | 6/2004 | Cornwell et al. | |
| 7,065,763 B1 | 6/2006 | Martin et al. | |
| 8,086,810 B2 | 12/2011 | Huber et al. | |
| 8,745,338 B1 | 6/2014 | Yadav et al. | |
| 8,745,350 B2 | 6/2014 | Lehr et al. | |
| 9,043,293 B2 | 5/2015 | Amit et al. | |
| 9,141,626 B2 | 9/2015 | Rajpal et al. | |
| 2003/0033328 A1 | 2/2003 | Cha et al. | |
| 2006/0085488 A1* | 4/2006 | Kitsuregawa | G06F 17/30339 |
| 2009/0210617 A1* | 8/2009 | Lehr | G06F 3/0617 |
| | | | 711/112 |

(Continued)

OTHER PUBLICATIONS

List of IBM Patents or Patent Applications Treated as Related.

*Primary Examiner* — Nicholas J Simonetti
(74) *Attorney, Agent, or Firm* — Nelson and Nelson; Daniel P. Nelson; Alexis V. Nelson

(57) ABSTRACT

A method for partially reorganizing a volume is disclosed. In one embodiment, such a method includes logically dividing a volume into multiple regions. The method further enables a computing system to perform a data reorganization operation on a particular region of the multiple regions, while enabling I/O to continue to the other regions. In the event a request for a data set allocation is received for the particular region while the data reorganization operation is taking place, the method automatically performs the data set allocation within other regions of the volume. When the data reorganization operation is complete, the method automatically moves the data set allocation from the region in which it was performed to the region associated with the original request.

20 Claims, 7 Drawing Sheets

(56) References Cited

U.S. PATENT DOCUMENTS

2010/0180093 A1* 7/2010 Huber .................... G06F 3/0611
                                                    711/162
2012/0110288 A1* 5/2012 Lehr ..................... G06F 3/0608
                                                    711/162
2012/0303918 A1* 11/2012 Reed .................... G06F 3/0608
                                                    711/165

* cited by examiner

PARTIAL VOLUME REORGANIZATION TO INCREASE DATA AVAILABILITY

BACKGROUND

Field of the Invention

This invention relates to systems and methods for increasing the data availability of logical volumes.

Background of the Invention

In the context of computer operating systems, a "volume" is a fixed amount of storage on disk, tape, or some other storage device. The term "volume" may be used to refer to either a "physical volume" or "logical volume." A "physical volume" may refer to a single physical storage device, such as a hard disk drive, solid state drive, optical disk (e.g., CD, DVD, etc.), tape cartridge, or the like. A "logical volume," by contrast, may not map directly to a single physical storage device. For example, a logical volume may span multiple physical volumes or a physical volume may be divided up into multiple logical volumes (e.g., partitions). Storage virtualization software may map storage elements in a logical volume to their actual physical locations on underlying physical storage devices. From the point of view of an operating system or application, a logical volume may appear to be a single physical volume.

With the advent of very large logical volumes such as Extended Addressable Volumes (EAVs) in the z/OS operating system, operations at a volume level can take a significant amount of time due to the increased amount of storage space in these volumes. This can significantly impact applications and users trying to access the logical volume when the logical volume needs to be serialized (i.e., locked while operations on the volume take place). For operations such as data defragmentation, data consolidation, and/or data rebalancing, where a lock may be issued against the entire volume (and more particularly against the volume table of contents (VTOC) associated with the volume), the volume may be inaccessible to other applications and users while the operations take place.

In view of the foregoing, what are needed are systems and methods to increase the data availability of volumes, particularly very large volumes such as Extended Addressable Volumes, while data reorganization operations are taking place. Ideally, such systems and methods will reduce or minimize the performance impacts associated with data reorganization operations.

SUMMARY

The invention has been developed in response to the present state of the art and, in particular, in response to the problems and needs in the art that have not yet been fully solved by currently available systems and methods. Accordingly, the invention has been developed to provide systems and methods to partially reorganize a volume to increase data availability on the volume. The features and advantages of the invention will become more fully apparent from the following description and appended claims, or may be learned by practice of the invention as set forth hereinafter.

Consistent with the foregoing, a method for partially reorganizing a volume is disclosed. In one embodiment, such a method includes logically dividing a volume into multiple regions. The method further enables a computing system to perform a data reorganization operation on a particular region of the multiple regions, while enabling I/O to continue to the other regions. In the event a request for a data set allocation is received for the particular region while the data reorganization operation is taking place, the method automatically performs the data set allocation within other regions of the volume. When the data reorganization operation is complete, the method automatically moves the data set allocation from the region in which it was performed to the region associated with the original request.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
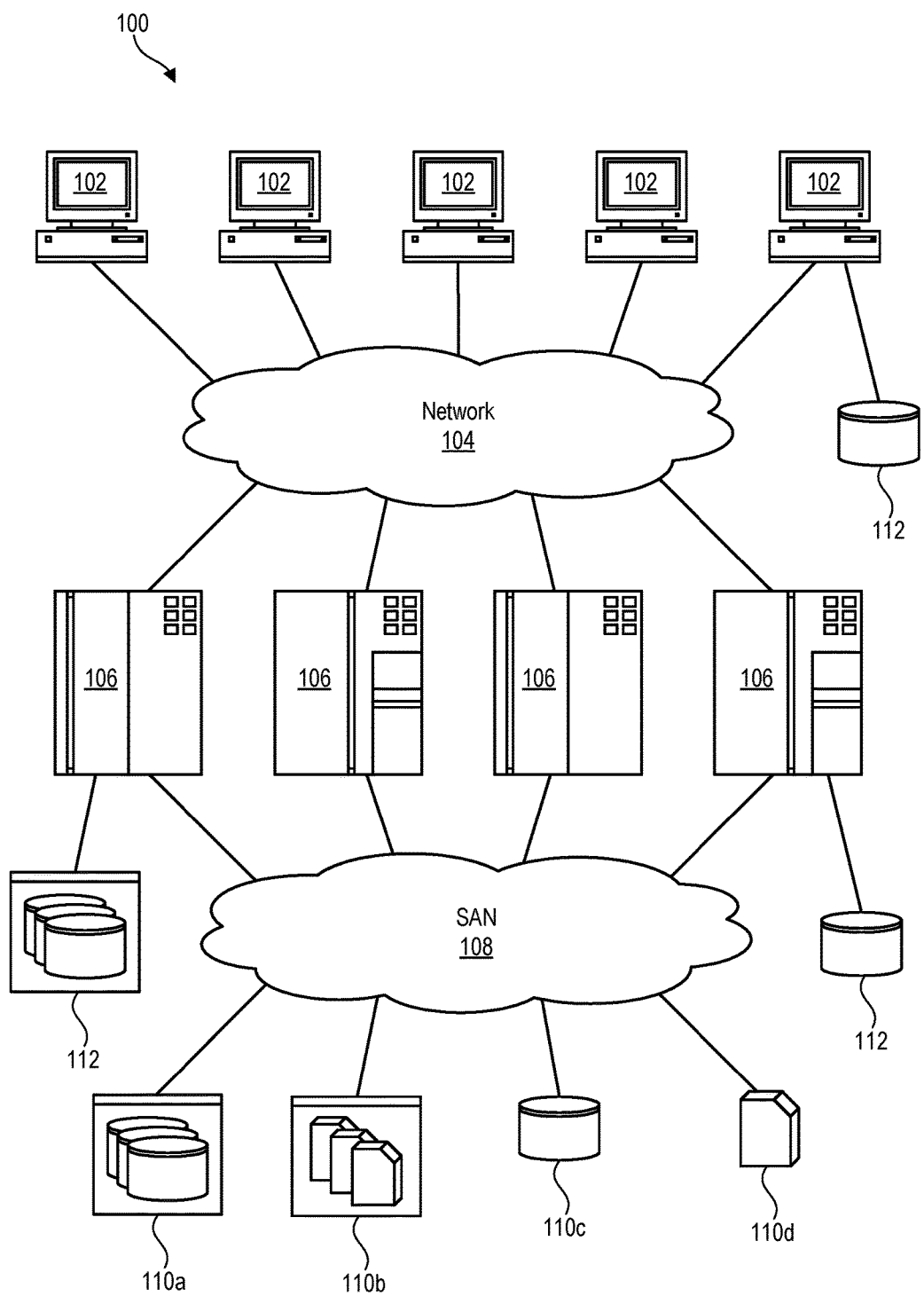
FIG. 1 is a high-level block diagram showing an exemplary environment in which a system and method in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
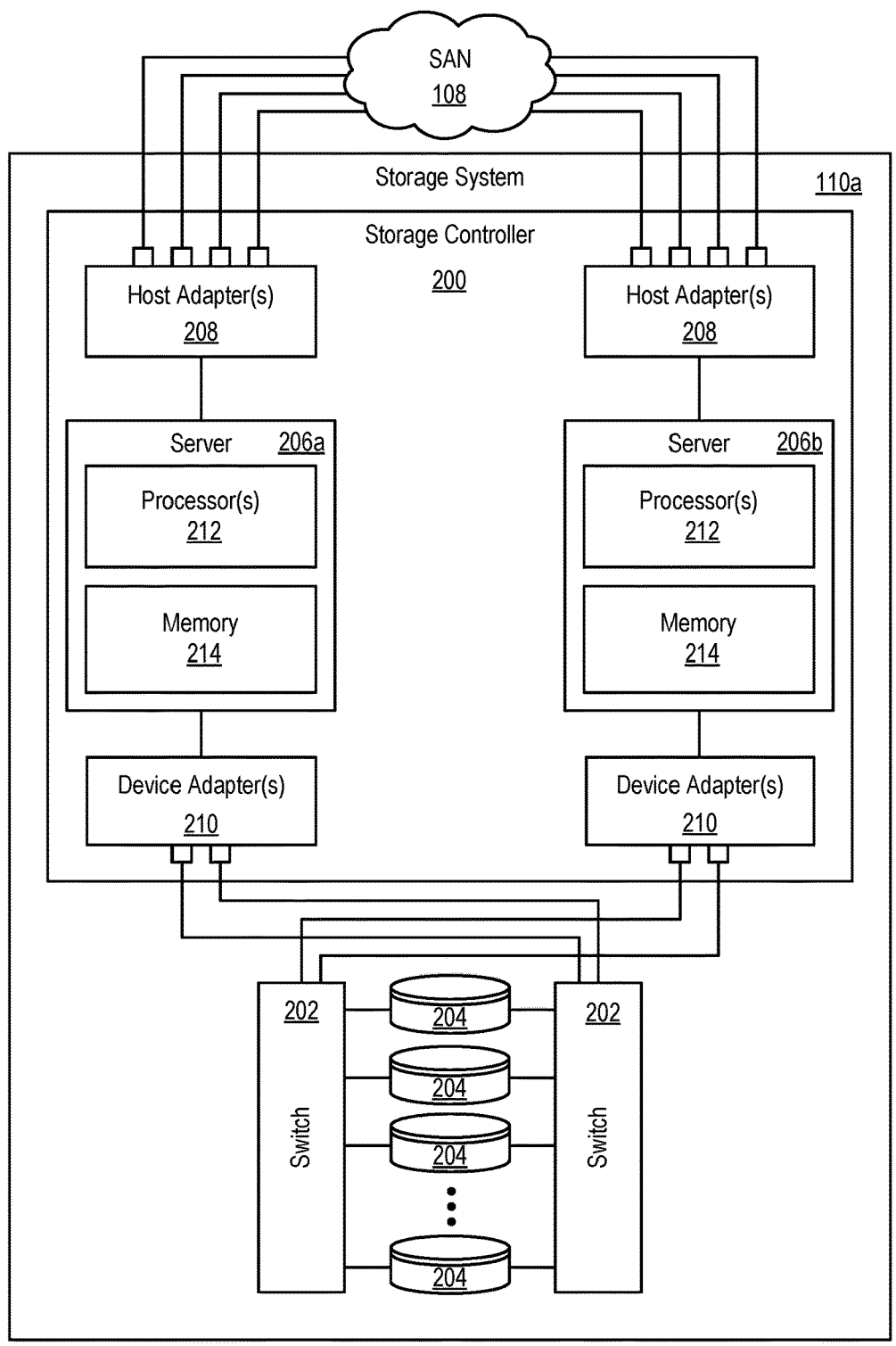
FIG. 2 is a high-level block diagram showing one embodiment of storage system hosting one or more physical drives.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage devices 204, such as hard-disk drives 204 or solid-state drives 204 (such as flash-memory-based drives 204). The storage controller 200 may enable one or more hosts 106 (e.g., open system and/or mainframe servers 106 running operating systems such as MVS, z/OS, or the like) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
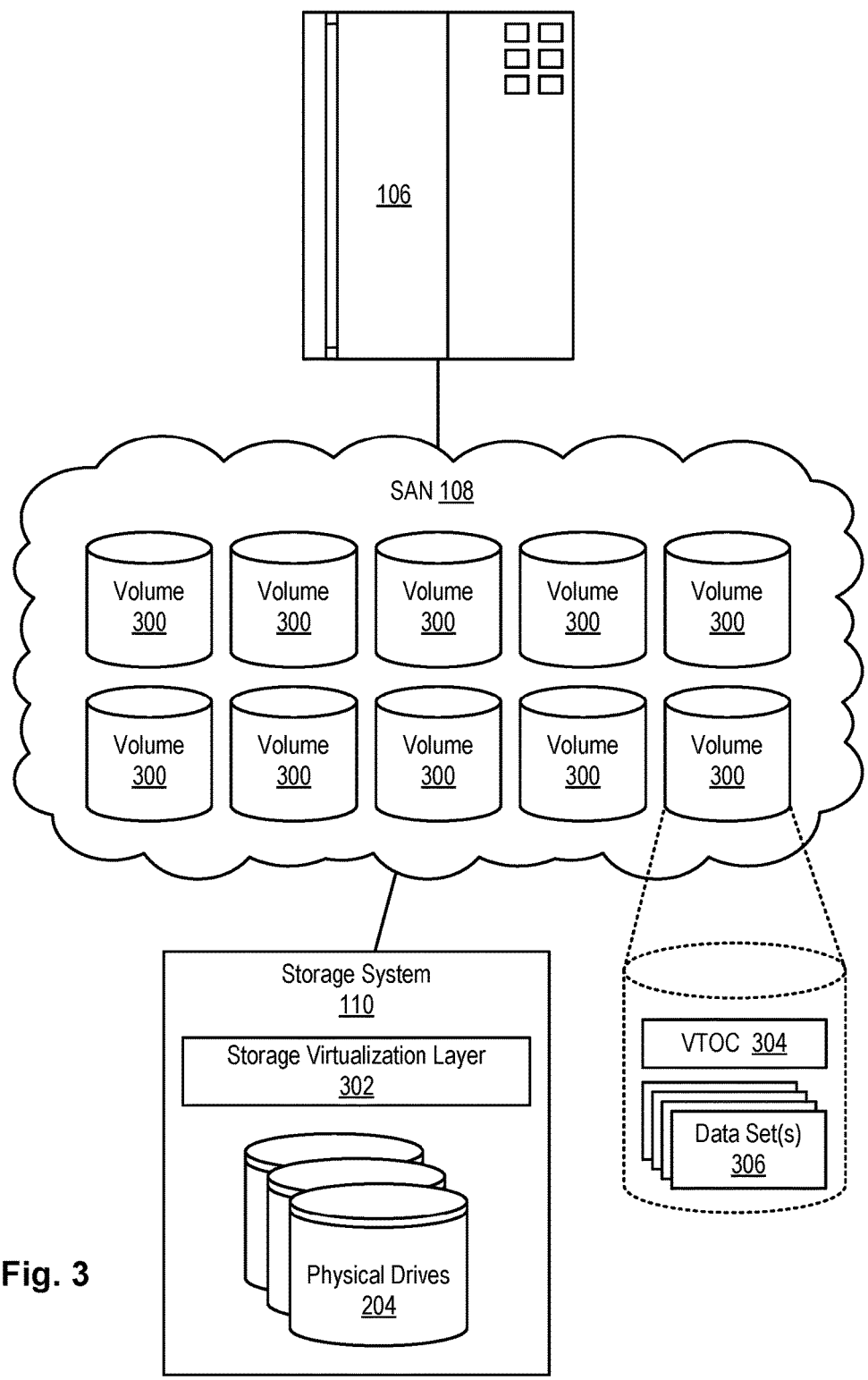
FIG. 3 is a high-level block diagram showing logical volumes exposed by a storage system, and particularly showing a volume table of contents (VTOC) and data sets stored on a logical volume.

Referring to FIG. 3, in certain embodiments, a storage system 110 such as that illustrated in FIG. 2 may be configured to present or expose one or more volumes 300 to a host system 106. The volumes 300 may be logical volumes 300, meaning that the volumes 300 may appear to be physical drives 204 (e.g., hard-disk drives, solid state drives, etc.) to a host system 106 but do not necessarily directly correlate to physical drives 204 on the storage system 110. For example, in certain embodiments, a physical drive 204 may be used by more than one logical volume 300 or a logical volume 300 may span all or part of multiple physical drives 204. A storage virtualization layer 302 within the storage system 110 may expose the logical volumes 300 and handle the mapping between the logical volumes 300 and the physical drives 204.

As further shown in FIG. 3, in certain embodiments, each logical volume 300 may store a volume table of contents (VTOC) 304 and one or more data sets 306. A VTOC 304 may contain information for locating data sets 306 on the associated logical volume 300. In certain embodiments, the VTOC 304 is located at the beginning of the logical volume 300 and may list the names of each data set 306 on the logical volume 300 as well as the data set's size, location, and permissions. The VTOC 304 may also store information describing each area of contiguous free space in the logical volume 300. The VTOC 304 is typically created at the time the logical volume 300 is initialized.

To access a particular data set 306 on a storage system 110, a host 106 may query a host-based catalog to determine the logical volume 300 on which the data set 306 resides. Once the correct logical volume 300 is determined, the host 106 locates the VTOC 304 on the logical volume 300 and searches the VTOC 304 to determine where the data set 306 is stored within the logical volume 300. The host 106 may then access the data set 306 at the determined location.

Figure 4:
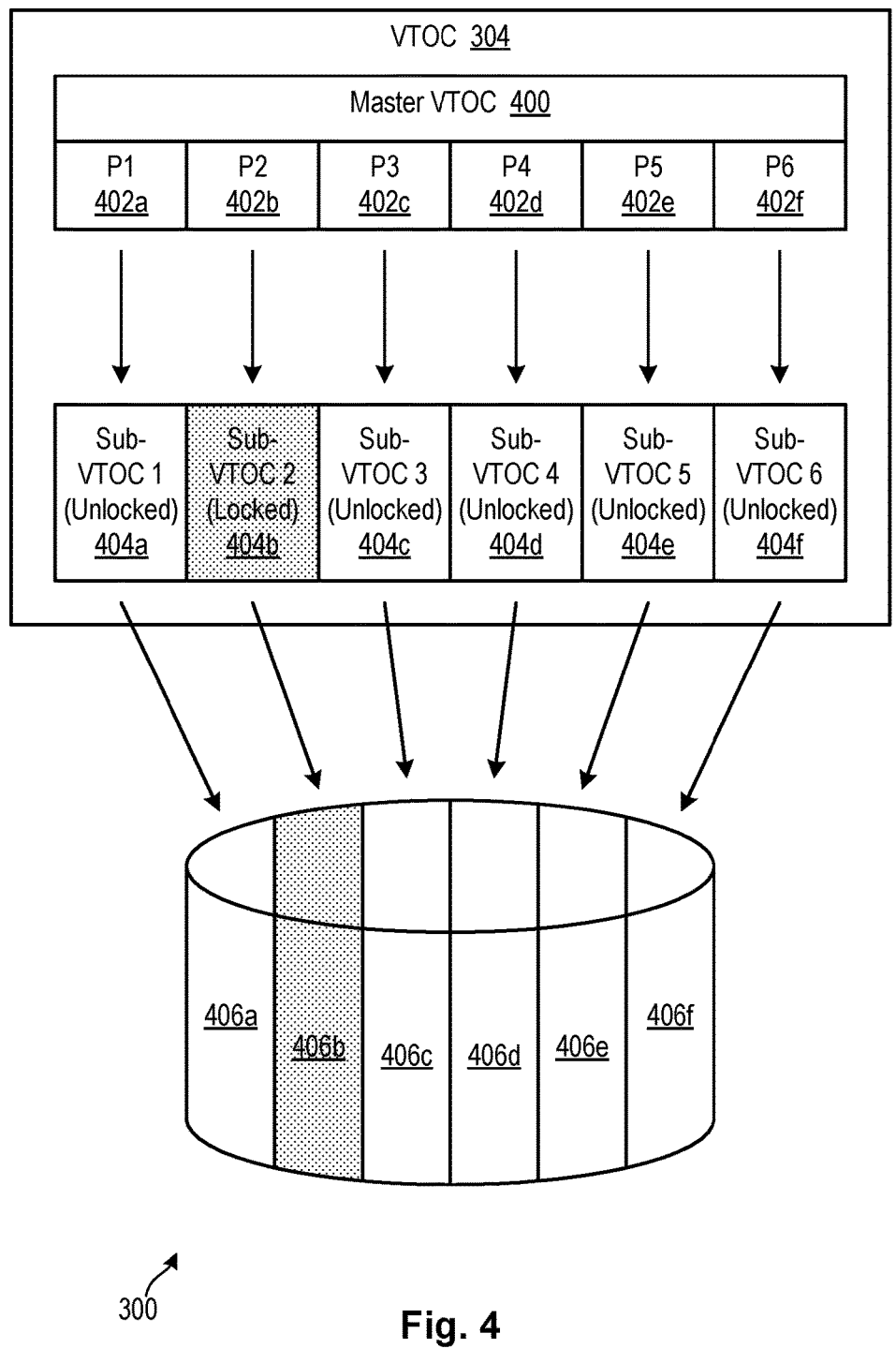
FIG. 4 is a high-level block diagram showing a logical volume divided up into a plurality of regions, and a multi-level VTOC for accessing data sets in the regions.

Referring to FIG. 4, as previously mentioned, with the advent of very large logical volumes 300 such as Extended Addressable Volumes (EAVs) in the z/OS operating system, operations at a volume level can take a significant amount of time due to the increased amount of storage space in the logical volume 300. This can cause significant performance impacts to applications and users in situations where a logical volume 300 needs to be serialized (i.e., locked while operations take place). For operations such as data defragmentation, data consolidation, and/or data rebalancing, where a lock may be issued against an entire logical volume 300 (and more particularly against a VTOC 304 associated with the logical volume 300), the logical volume 300 may be inaccessible to other users or applications while the operations take place.

In order to increase the availability of data on a logical volume 300 that is having its data reorganized, a logical volume 300 may be divided into or one or more regions 406a-f. Each of these regions 406 may include a range of storage elements, such as tracks, within the logical volume 300. In certain embodiments, the regions 406 are sized substantially equally. A data reorganization operation (e.g., data defragmentation, data consolidation, data rebalancing, etc.) may then be performed on each region 406 of the logical volume 300 in a sequential manner as opposed to on the logical volume 300 as a whole. While a region 406 is being reorganized, the region 406 may be locked to prevent conflicts with other users/systems. Regions 406 that are not being reorganized at any given time may remain unlocked to enable access to the data thereon.

In order to enable the region-based operation of the logical volume 300, the VTOC 304 of the logical volume 300 may, in certain embodiments, be organized as a multi-level VTOC 304. This multi-level VTOC 304 may include a sub-VTOC 404 for each region 406 in the logical volume 300. Each sub-VTOC 404 may contain information about data sets 306 in the associated region 406. To locate the appropriate sub-VTOC 404 associated with a data set 306, the VTOC 304 may include a master VTOC 400 that contains a pointer 402 to each sub-VTOC 404 as well as indicate the range of storage elements that are associated with the sub-VTOC 404.

In operation, when a host system 106 wishes to update a data set 306, the host system 106 accesses its catalog to determine the logical volume 300 on which the data set 306 resides. Because a catalog entry may exist for all catalog data sets, an additional field may be added to each catalog entry which indicates the range of storage elements on which the data set 306 resides. Knowing the logical volume 300 and range of storage elements on the logical volume 300, the host system 106 may search the master VTOC 400 to find the address of the sub-VTOC 404. The host system 106 may then lock the sub-VTOC 404 to access the data set 306 on the associated region 406. Meanwhile, the sub-VTOCs 404 associated with other regions 406 in the logical volume 300 may remain unlocked so that data sets 306 may be accessed on the regions 406. Once a data set 306 has been accessed on a region 406 and the associated sub-VTOC 404 has been updated, it may released and unlocked. Ideally, the only time the master VTOC 400 will be locked is when the logical volume 300 is initialized and the master VTOC 300 is established or, subsequently, when pointers 402 are added, deleted, or changed within the master VTOC 400, such as when more sub-VTOCs 404 are created.

Using the multi-level VTOC 304, a data reorganization operation may be performed on a specific region 406 within the logical volume 300 as opposed to on the entire logical volume 300. For example, as shown in FIG. 4, assume that a host system 106 wants to reorganize region 406b. To do so, the host system 106 may lock the sub-VTOC 404 associated with the region 406b and perform the data reorganization operation on the region 406. Meanwhile, the other regions 406 may remain unlocked, thereby allowing other systems and/or applications to access and modify data on the associated regions 406.

In certain cases, a data reorganization operation may require locking multiple regions 406 at the same time. For example, if a data set 306 needs to be moved from a first region 406b to a second region 406e as part of a data reorganization operation (such as to rebalance data sets 306 between regions 406 of a logical volume 300 if a sub-VTOC 404 is full or close to full; consolidate data sets 306 into a smaller number of regions 406; and/or defragment a logical volume 300 to create more contiguous free space), the data reorganization operation may lock both regions 406b, 406e to allow the data to be read from the first region 406b and written to the second region 406e, while leaving other regions 406 unlocked. Alternatively, the regions 406 may be locked and unlocked in sequence. For example, the first region 406b may be locked to read the data set 306 into memory from the first region 406b (and possibly delete the data set 306 from the first region 406). The first region 406b may then be unlocked. The second region 406e may then be locked and the data set 306 may be written from memory to the second region 406e. The second region 406e may then be unlocked. Thus, in certain embodiments, a data reorganization operation may require simultaneously or sequentially locking multiple regions 406 in the logical volume 300.

Figure 5:
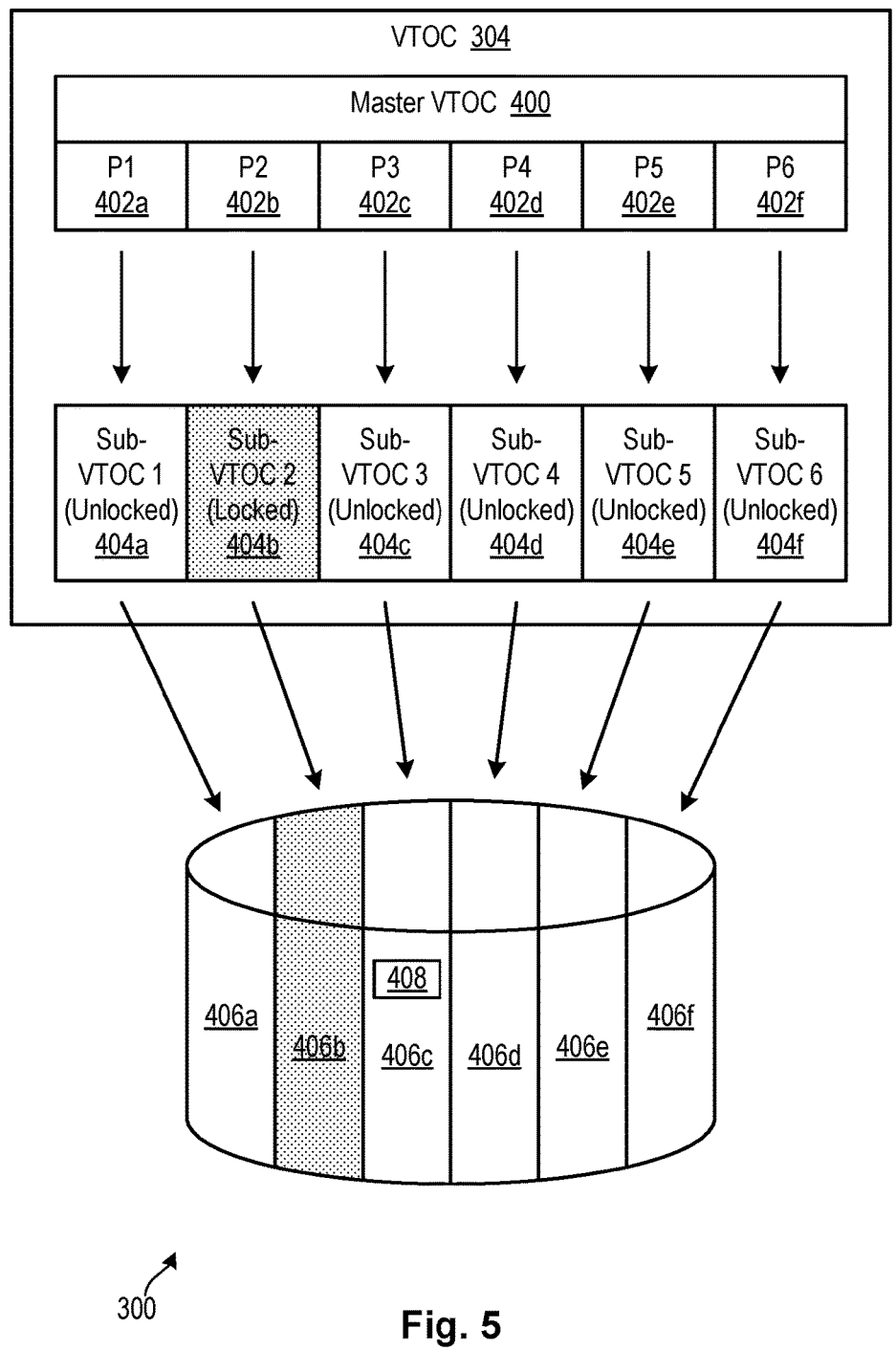
FIG. 5 is a high-level block diagram showing a data set allocation shifted to an unlocked region of the logical volume.

Referring to FIG. 5, in certain embodiments, functionality may be provided to accommodate a read or write to a data set 306 in a region 406, or an allocation of space to a data set 306 in a particular region 406, even while the region 406 is locked. In particular, systems and methods in accordance with the invention may utilize other unlocked regions 406 in the logical volume 300 while the intended region 406 is locked as part of a data reorganization operation. When the data reorganization operation is complete and the intended region 406 is unlocked, the data set allocation may be automatically transferred to the intended region 406. This may improve the data availability of the logical volume 300 since data set allocations may be accommodated even for regions 406 that are locked.

Figure 6:
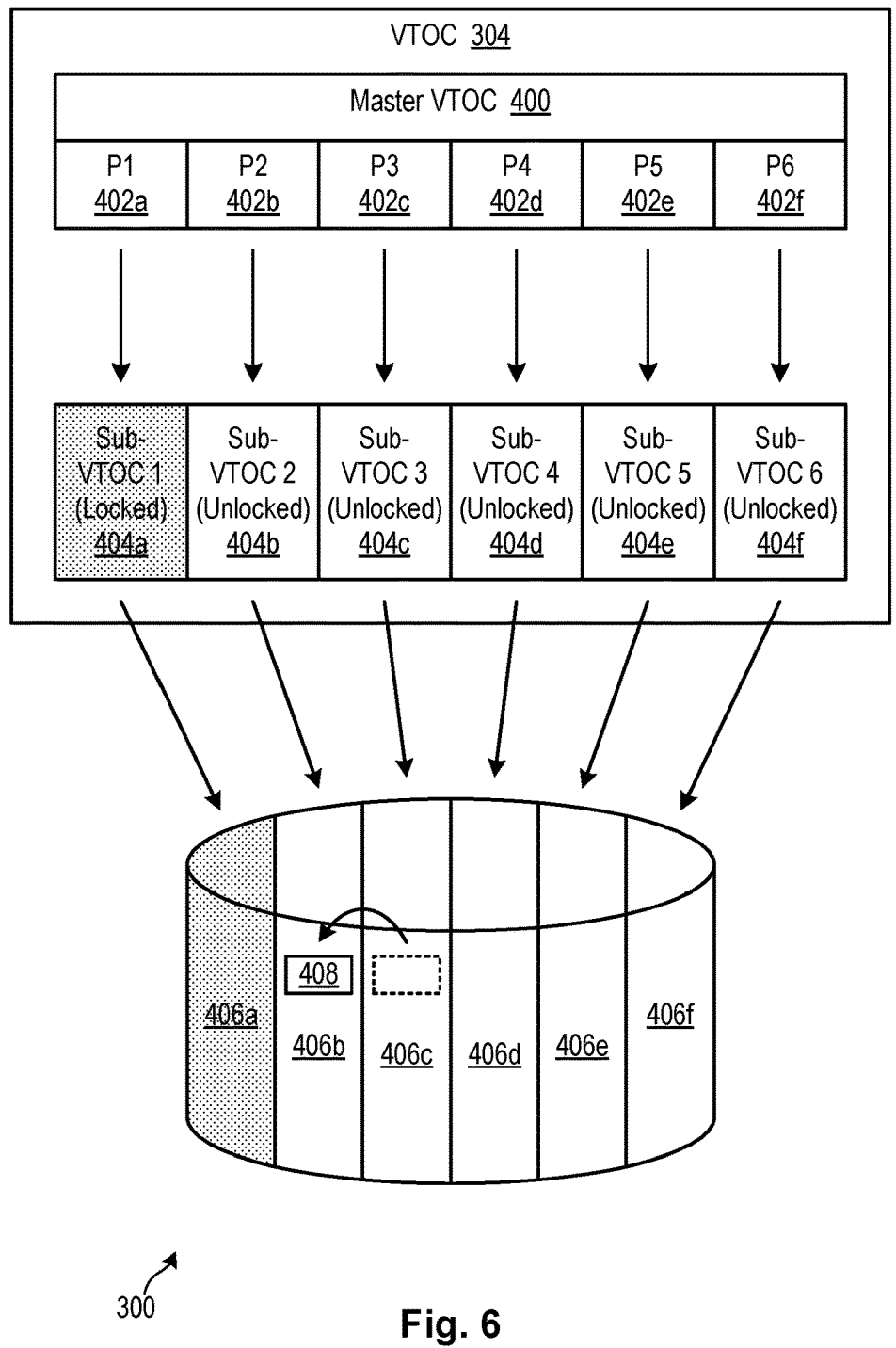
FIG. 6 is a high-level block diagram showing movement of a data set allocation after a region has been unlocked.

For example, referring to FIG. 5, assume that a request for a data set allocation (e.g., a request to allocate a new data set 306, increase storage space in an existing data set 306, etc.) is received for a region 406b while the region 406b is locked and having its data reorganized. Instead of rejecting the request, systems and methods in accordance with the invention may accommodate the request by performing the data set allocation 408 in another unlocked region 406c of the logical volume 300, as shown in FIG. 5. Once the data reorganization operation is complete in region 406b, the region 406b may be unlocked and the data set allocation 408 automatically moved to the region 406b, as shown in FIG. 6. In this way, a request for a data set allocation 408 to a region 406 may be accommodated even when the region 406 is locked.

Figure 7:
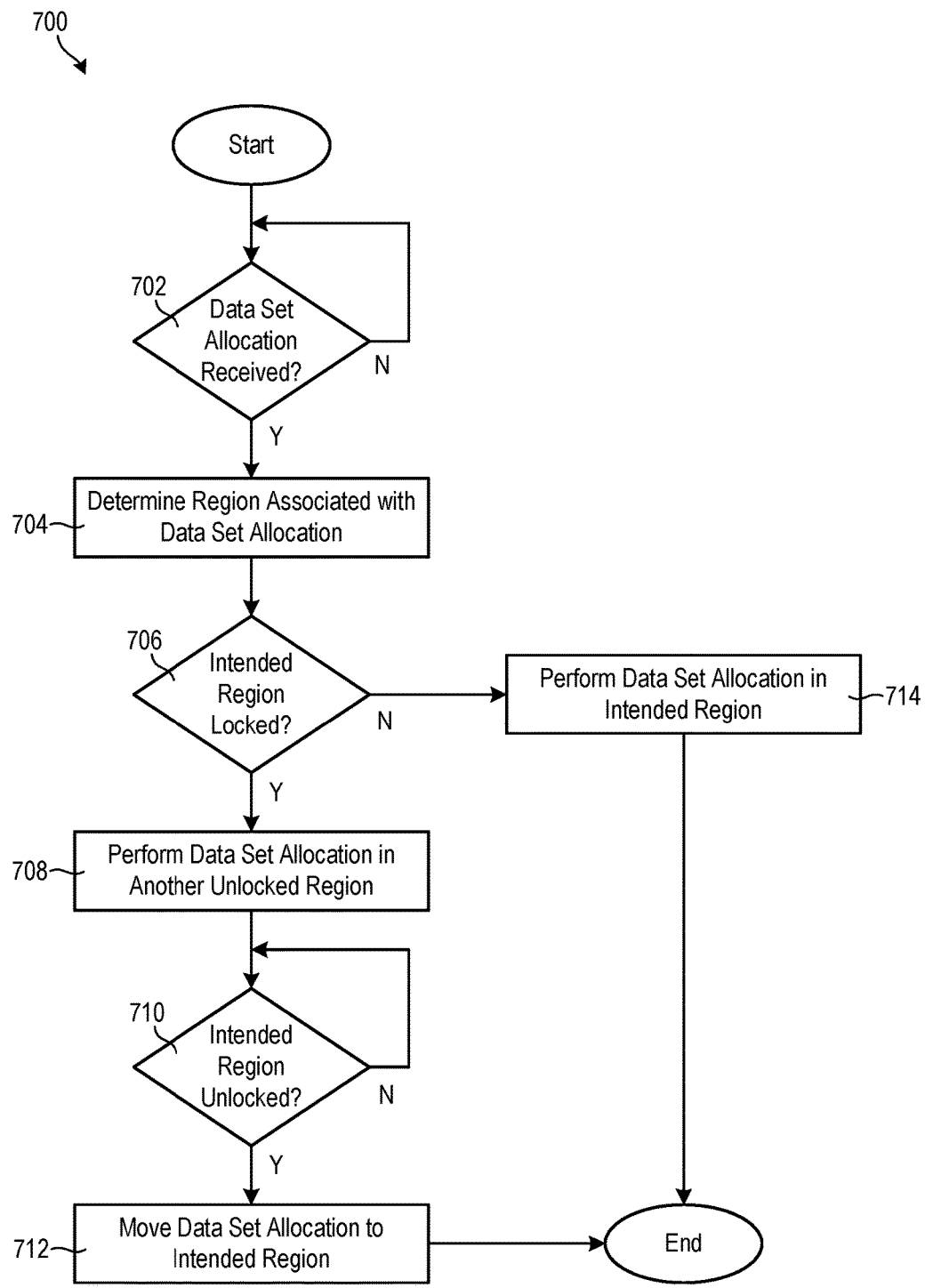
FIG. 7 shows one embodiment of a method for performing a data set allocation in a logical volume divided up into a plurality of regions.

Referring to FIG. 7, one embodiment of a method 700 for performing a data set allocation in a logical volume 300 divided up into a plurality of regions 406 is illustrated. As shown, the method 700 initially determines 702 whether a request for a data set allocation 408 has been received. If a request has been received, the method 700 determines 704 which region 406 is associated with the data set allocation 408. This may include determining a logical volume 300 and a range of storage elements associated with the data set allocation 408.

The method 700 then determines 706 whether the region 406 associated with the data set allocation 408 is locked. If the region 406 is not locked, the method 700 performs 714 the data set allocation 408 in the intended region 406 and the method 700 ends. If the region 406 is locked, the method 700 performs 708 the data set allocation 408 in another unlocked region 406 of the logical volume 300.

The method 700 then determines 710 when the region 406 that was the intended target of the request is unlocked. When the region 406 is unlocked, the method 700 moves 712 the data set allocation 408 to the intended region 406 and the method 700 ends.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for partially reorganizing a logical volume, the method comprising:
dividing a logical volume into a plurality of regions, the logical volume having associated therewith a single volume table of contents containing information for locating data sets in the logical volume;

enabling a computing system to lock a particular region of the plurality of regions and perform a data reorganization operation on the particular region while the lock is in place, while enabling I/O to continue to other regions of the plurality of regions;

in the event a request for a data set allocation is received for the particular region while the lock is in place, automatically performing the data set allocation within the other regions; and when the data reorganization operation is complete and the lock is released, automatically moving the data set allocation from the other regions to the particular region.

2. The method of claim 1, wherein the data reorganization operation is selected from the group consisting of a defragmentation operation, a data consolidation operation, and a data rebalancing operation.

3. The method of claim 1, further comprising enabling the computing system to, while the particular region is locked, leave the other regions unlocked.

4. The method of claim 3, wherein the single volume table of contents is a multi-level volume table of contents (multi-level VTOC) stored on the logical volume, the multi-level VTOC comprising a sub-VTOC for each region of the plurality of regions.

5. The method of claim 4, wherein locking the particular region comprises locking the sub-VTOC for the particular region.

6. The method of claim 5, wherein leaving the other regions unlocked comprises leaving the sub-VTOCs for the other regions unlocked.

7. The method of claim 1, wherein the data reorganization operation moves from region to region in the plurality of regions until the entire logical volume is reorganized.

8. A computer program product for partially reorganizing a logical volume, the computer program product comprising a non-transitory computer-readable storage medium having computer-usable program code embodied therein, the computer-usable program code comprising:

computer-usable program code to divide a logical volume into a plurality of regions, the logical volume having associated therewith a single volume table of contents containing information for locating data sets in the logical volume;

computer-usable program code to enable a computing system to lock a particular region of the plurality of regions and perform a data reorganization operation on the particular region while the lock is in place, while enabling I/O to continue to other regions of the plurality of regions;

computer-usable program code to, in the event a request for a data set allocation is received for the particular region while the lock is in place, automatically perform the data set allocation within the other regions; and computer-usable program code to, when the data reorganization operation is complete and the lock is released, automatically move the data set allocation from the other regions to the particular region.

9. The computer program product of claim 8, wherein the data reorganization operation is selected from the group consisting of a defragmentation operation, a data consolidation operation, and a data rebalancing operation.

10. The computer program product of claim 8, further comprising computer-usable program code to, while the particular region is locked, leave the other regions unlocked.

11. The computer program product of claim 10, wherein the single volume table of contents is a multi-level volume table of contents (multi-level VTOC) stored on the logical volume, the multi-level VTOC comprising a sub-VTOC for each region of the plurality of regions.

12. The computer program product of claim 11, wherein locking the particular region comprises locking the sub-VTOC for the particular region.

13. The computer program product of claim 12, wherein leaving the other regions unlocked comprises leaving the sub-VTOCs for the other regions unlocked.

14. The computer program product of claim 8, wherein the data reorganization operation moves from region to region in the plurality of regions until the entire logical volume is reorganized.

15. A system for partially reorganizing a logical volume, the system comprising:

at least one processor;

at least one memory device coupled to the at least one processor and storing instructions for execution on the at least one processor, the instructions causing the at least one processor to;

divide a logical volume into a plurality of regions, the logical volume having associated therewith a single volume table of contents containing information for locating data sets in the logical volume;

enable a computing system to lock a particular region of the plurality of regions and perform a data reorganization operation on the particular region while the lock is in place, while enabling I/O to continue to other regions of the plurality of regions;

in the event a request for a data set allocation is received for the particular region while the lock is in place, automatically perform the data set allocation within the other regions; and when the data reorganization operation is complete and the lock is released, automatically move the data set allocation from the other regions to the particular region.

16. The system of claim 15, wherein the data reorganization operation is selected from the group consisting of a defragmentation operation, a data consolidation operation, and a data rebalancing operation.

17. The system of claim 15, wherein the instructions further cause the at least one processor to, while the particular region is locked, leave the other regions unlocked.

18. The system of claim 17, wherein the single volume table of contents is a multi-level volume table of contents (multi-level VTOC) stored on the logical volume, the multi-level VTOC comprising a sub-VTOC for each region of the plurality of regions.

19. The system of claim 18, wherein locking the particular region comprises locking the sub-VTOC for the particular region.

20. The system of claim 19, wherein leaving the other regions unlocked comprises leaving the sub-VTOCs for the other regions unlocked.

* * * * *